United States Patent
Winkelman et al.

(10) Patent No.: US 6,276,535 B1
(45) Date of Patent: Aug. 21, 2001

(54) METHOD FOR PROVIDING INSTRUCTIONS TO A MAIL SORTING APPARATUS

(75) Inventors: John H. Winkelman, Southbury; Kevin W. Bodie, Bethel, both of CT (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/452,005

(22) Filed: Nov. 30, 1999

(51) Int. Cl.$^7$ .................................................. B07C 5/00
(52) U.S. Cl. ...................... 209/547; 209/509; 209/546; 209/552; 209/559
(58) Field of Search ................................. 209/509, 546, 209/547, 552, 559

(56) References Cited

U.S. PATENT DOCUMENTS

| | | | |
|---|---|---|---|
| 5,043,908 | 8/1991 | Manduley et al. | 364/478 |
| 5,146,403 | 9/1992 | Goodman | 364/401 |
| 5,200,007 | 4/1993 | Svyatsky | 156/64 |
| 5,227,970 | 7/1993 | Harris | 364/419 |
| 5,291,002 | 3/1994 | Agnew et al. | 235/375 |
| 5,422,821 | 6/1995 | Allen et al. | 364/478 |
| 5,452,203 | 9/1995 | Moore | 364/401 |
| 5,518,122 | 5/1996 | Tilles et al. | 209/539 |

*Primary Examiner*—Donald P. Walsh
*Assistant Examiner*—Mark J Beauchaine
(74) *Attorney, Agent, or Firm*—Alberta A. Vitale; Michael E. Melton

(57) ABSTRACT

The method of the present invention relates generally to a method for sorting mailpieces using a mail sorting apparatus. In one embodiment of the present invention, instructions are provided to the mail sorting apparatus in a machine readable format such as barcode. The instructions are printed on a form that can be fed into the mail sorting apparatus in the same manner that a mailpiece is fed into the mail sorting apparatus. The form is run through the feed path of the mail sorting apparatus. The barcode is read using a scanner. A signal on the form indicates that the mailpiece is a form, and that information contained in the barcode is an instruction. The instruction may be, for example, an instruction to 1) halt may be implemented through use or reprogramming of application software may be presented by using the form. The method provides for sorting of mailpieces with less stopping of the sorting apparatus to provide new instructions.

9 Claims, 3 Drawing Sheets

METHOD FOR PROVIDING INSTRUCTIONS TO A MAIL SORTING APPARATUS

RELATED APPLICATIONS

Reference is made to application Ser. No. 09/451,458 titled METHOD OF UPDATING AN ADDRESSEE DATABASE IN A MAIL SORTING APPARATUS, assigned to the assignee of this application and filed on even date herewith.

FIELD OF THE INVENTION

The invention disclosed herein relates generally to a method for sorting mailpieces using a mail sorting apparatus and, more particularly, to a method for providing instructions to a mail sorting apparatus

BACKGROUND OF THE INVENTION

The processing and handling of mailpieces consumes an enormous amount of human and financial resources, particularly if the processing of the mailpieces is done manually. The processing and handling of mailpieces not only takes place at the Postal Service, but also occurs at each and every business or other site where communication via the mail delivery system is utilized. That is, various pieces of mail generated by a plurality of departments and individuals within a company need to be addressed, collected, sorted, and franked as part of the outgoing mail process. Additionally, incoming mail needs to be collected and sorted efficiently to ensure that it gets to the addressee in a minimal amount of time. Since much of the documentation and information being conveyed through the mail system is critical in nature relative to the success of a business, it is imperative that the processing and handling of both the incoming and outgoing mailpieces be done efficiently and reliably so as not to negatively impact the functioning of the business.

Mailpiece sorting can be performed manually or with automated equipment designed specifically to perform the sorting task. Manual sorting is labor intensive and time consuming and, historically, has been done using pigeon hole type sorting stations. Typical modern mailpiece sorting apparatus incorporate a feeding mechanism for feeding mailpieces, a separating mechanism for separating the mailpieces from each other, a reading device for reading the information on the mailpieces, a mailpiece transport mechanism for transporting the mailpieces to compartments or bins, bins for receiving the mailpieces, and software for making choices regarding placement of mailpieces into the compartments and a control device.

The operation of automated sorting equipment typically entails an operator placing an armload of mail that has been edge aligned onto the feeding mechanism. The mailpieces are fed into the separating mechanism, read and sorted into bins. Typically, when one or more bins become full, the sorting apparatus stops and the bins are manually emptied into a mail tray by an operator. The mail sorting apparatus may also be stopped when there is a change in sort plan that requires a software change. For example, when a new group of mailpieces needs to be sorted, a new sort plan designating the bins into which the mailpieces will be sorted needs to be determined. This is done by manually making software changes such as, for example, choosing a sort scheme. This typically requires the sorting apparatus to be stopped, the bins swept and new mailpieces to be loaded. The foregoing increases the amount of time that is required to sort the mail.

Thus, one of the problems of the prior art is that some sorting equipment shut down frequently for sort scheme changes or other instructions. Another problem of the prior art is that the sorting equipment sorting time is not maximized. Another problem of the prior art is that changing sorting schemes is time consuming and requires manual reprogramming.

SUMMARY OF THE INVENTION

This invention overcomes the disadvantages of the prior art by providing a method of sorting mailpieces which reduces the amount of time the sorting process is stopped to change sort schemes or request other sorting instructions. This, in turn, affords quicker mailpiece processing. The present invention is directed to, in a general aspect, a method of providing instructions to a mailpiece sorting apparatus In one embodiment, the invention allows an operator to efficiently begin one sorting job, end the sorting job, begin another sorting job, end the other sorting job before completion and return to the original sorting job. Thus, the operator may easily change jobs with little down time as priorities change.

In one embodiment of the present invention, instructions are provided to the mail sorting apparatus in a machine readable format such as barcode. The instructions are printed on a form that can be fed into the mail sorting apparatus in the same manner that a mailpiece is fed into the mail sorting apparatus. The form is run through the feed path of the mail sorting apparatus. The barcode is read using a scanner or the like. A signal on the form indicates that the mailpiece is a form, and that information contained in the barcode is an instruction. The instruction may be, for example, an instruction to 1) halt and reload a sort scheme; 2) change to a new sort scheme; 3) disable inline printing; 4) bill the sort to a particular customer or cost center; or 5) update the addressee database. Other instructions may also be presented to the mail sorting apparatus. Instructions that may be implemented through use or reprogramming of application software may be presented by using the form. The method provides for sorting of mailpieces with less stopping of the mailpiece sorting apparatus to provide new instructions.

Thus, an advantage of the method of the present invention is that it requires less stopping of the sorting apparatus for providing instructions. Another advantage of the method of the present invention is that it provides a method of updating instructions that reduces program costs. Other advantages of the invention will in part be obvious and will in part be apparent from the specification. The aforementioned advantages are illustrative of the advantages of the various embodiments of the present invention.

DETAILED DESCRIPTION OF THE PRESENT INVENTION

Figure 1:
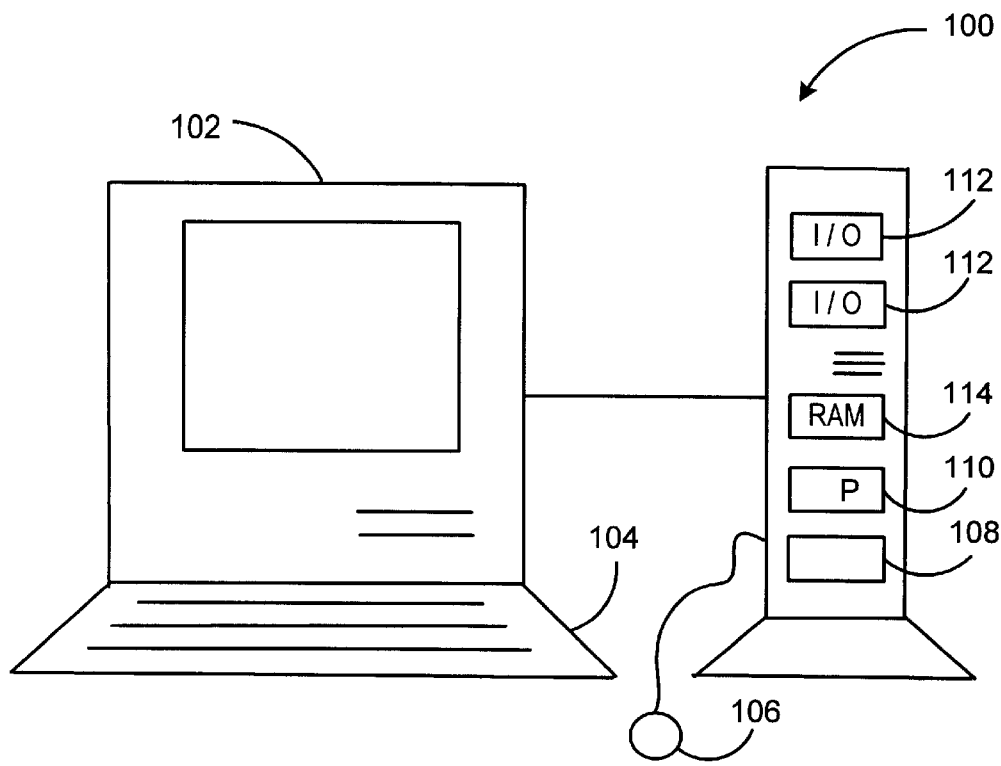
FIG. 1 is a block diagram that illustrates a computer system with which an embodiment of the invention may be implemented.

In describing the present invention, reference will be made herein to FIGS. 1–5 of the drawings in which like numerals refer to like features of the present invention. Features of the invention are not necessarily shown to scale in the drawings.

Hardware Overview

FIG. 1 is a block diagram that illustrates a computer system 100 upon which an embodiment of the invention may be implemented. Computer system 100 may be a personal computer which is used generically and refers to present and future microprocessing systems with at least one processor operatively coupled to user interface means, such as a display 102 and keyboard 104, and/or a cursor control, such as a mouse or a trackball 106, and storage media 108. The personal computer 100 may be a workstation that is accessible by more than one user. The personal computer system 100 also includes a conventional processor 110, such as the Pentium II™ microprocessors manufactured by Intel, and conventional hard drive 108, floppy drive(s) 112, and memory 114.

Figure 2:
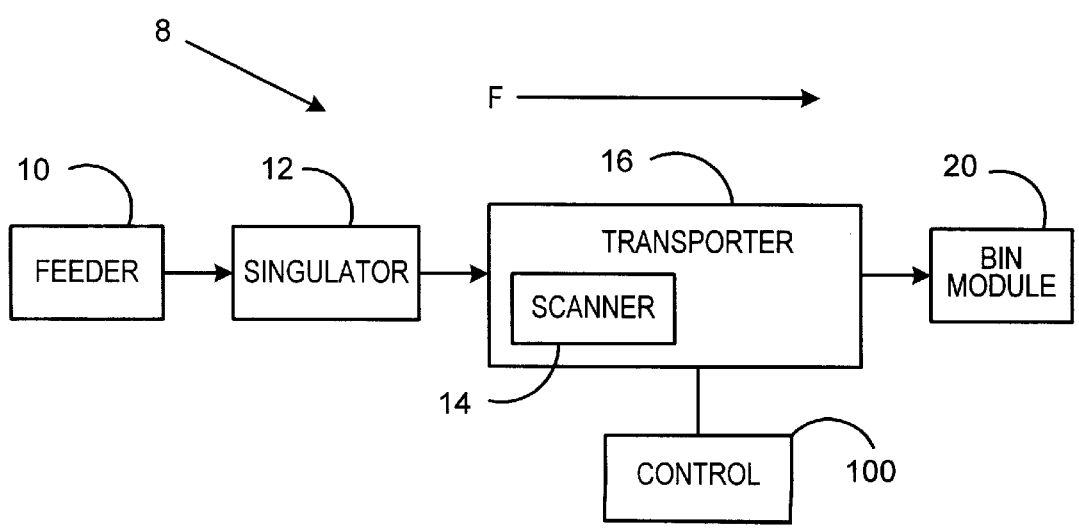
FIG. 2 illustrates the connection of the computer system to the sorting apparatus.

The computer system 100 is connected to a sorting apparatus as illustrated in FIG. 2. The mailpiece sorting apparatus 8 may generally include a feeder 10, a scanner 14, a mailpiece transporter 16, compartments or bins 20 for receiving sorted mailpieces and a control system which may be the microprocessor based personal computer system 100 described above. Arrow F indicates the direction of the mailpiece feed in the mail sorting apparatus 8. In an alternate embodiment, the mail sorting apparatus 8 may also include an in-line printer for printing information on mailpieces. The system may be controlled by a microprocessor controller 100 such as, for example, a personal computer with a Pentium II™ microprocessor. The microprocessor can run an operating system such as a QNX operating system that provides real-time control of the components of the mailpiece sorting apparatus 8. The computer also includes appropriate memory devices for storage of information such as an address database. One of ordinary skill in the art would be familiar with the general components of the sorting apparatus upon which the method of the present invention may be performed.

The present invention is related to the use of computer system 100 connected to the mailpiece sorting apparatus 8 for performing application software methods. The methods of the present invention are used to provide instructions to a mailpiece sorting apparatus.

Providing Instructions

In one embodiment of the present invention, instructions are provided to the mail sorting apparatus 8 in a machine readable format such as barcode. The instructions are printed on a form that can be fed into the mail sorting apparatus 8 in the same manner that a mailpiece is fed into the mail sorting apparatus 8. The form is run through the feed path F of the mail sorting apparatus 8. The barcode is read using scanner 14 or the like. A signal on the form indicates that the mailpiece is a form, and that information contained in the barcode is an instruction. The instruction may be, for example, an instruction to 1) halt and reload a sort scheme; 2) change to a new sort scheme; 3) disable inline printing; 4) bill the sort to a particular customer or cost center; or 5) update the addressee database. A sort scheme is an instruction used by the mail sorting apparatus 8 which determines the delivery of mailpieces to particular bins based upon information such as, for example, addressee name, mailstop, street address, zip code or other criteria. Other instructions may also be presented to the mail sorting apparatus 8. Instructions that may be implemented through use or reprogramming of application software may be presented by using the form.

Figure 3:
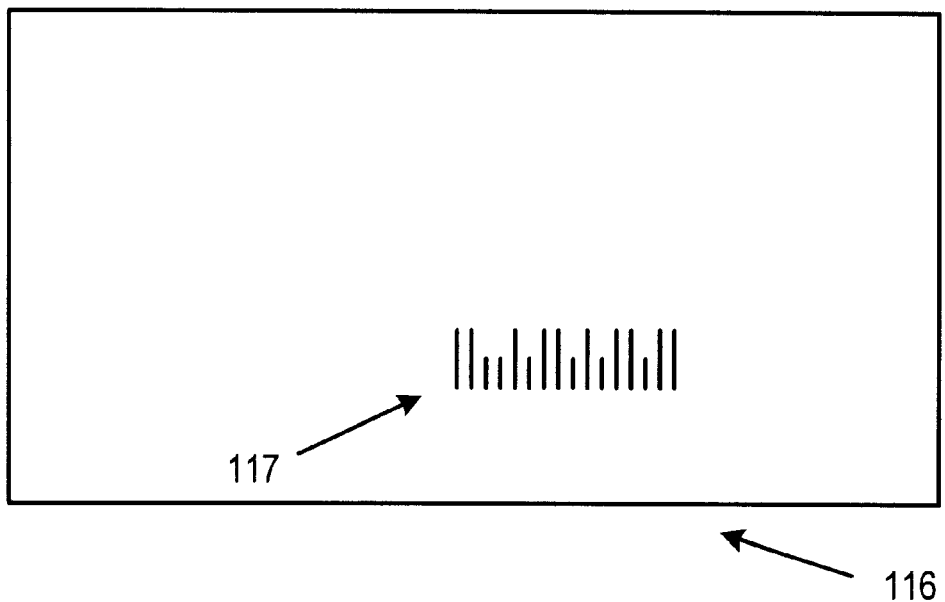
FIG. 3 illustrates an instruction form that may be used to perform an embodiment of the method of the present invention.

An example instruction form 116 is illustrated in FIG. 3. The barcode instruction 117 may be formatted and printed using software on a personal computer (not shown), or the like. The barcode instructions could comprise path information that directs the mail sorting apparatus to an instruction file. The instruction file could be stored in a memory associated with a computer such as, for example, a personal computer which is interfaced with the mail sorting apparatus via a communications interface. The instruction file could be manually edited by a user that has access to the computer on which the instruction file is stored.

In addition to using the computer to format and print the instructions, the computer may also validate the instructions. For example, if the desired instructions consist of stopping a sort scheme and prompting an operator to load mailpieces for a new sort and a typographical error is made that would cause the instructions to first prompt the operator to load mailpieces for a new sort scheme and then stop the first sort scheme, then the desired instructions would not be performed. Additional validation includes correction of logical errors (i.e. the addition of a name into an address field in the database), unknown commands (i.e. the command to "ssmt machine" is desired to mean "stop machine") and sequencing errors (i.e. commands presented out of logical order). Validation of instructions would help reduce the instances of instruction error.

The advantages to using bar-coded instructions are that the bar code provides a higher read rate than a hand written instruction, and it can contain more information than generally would be available on a handwritten instruction. The bar code can be any appropriate style of barcode including, but not limited to, one or two dimensional bar code. Two dimensional barcodes can store over a kilobyte of data in the same space as a one dimensional barcode and use error-correction techniques that allow them to withstand damage that would disable reading of one dimensional bar codes.

The barcode or other formatted instructions could alternatively be printed using magnetic ink to print instructions and read using Magnetic Ink Character Recognition (MICR). MICR is a character recognition system using special ink and characters which can be magnetized and read automatically.

Table A illustrates an example of instructions for stopping the processing of a current sort job in the mail sorting apparatus in order to run a new sort job or scheme and then resume the sort job that was interrupted. The instructions are illustrated in the general format <command><data> which is representative of an interpreted program language such as Perl or HTML with which implementation of instructions for the method of the present invention may be performed. Other machine readable programming languages as determined by one of ordinary skill in the art may be used.

Table A

<halt current job><157756>
<load new sort scheme><157780>
<run new sort scheme><157780>
<continuation of old job><157756>

Figure 4:
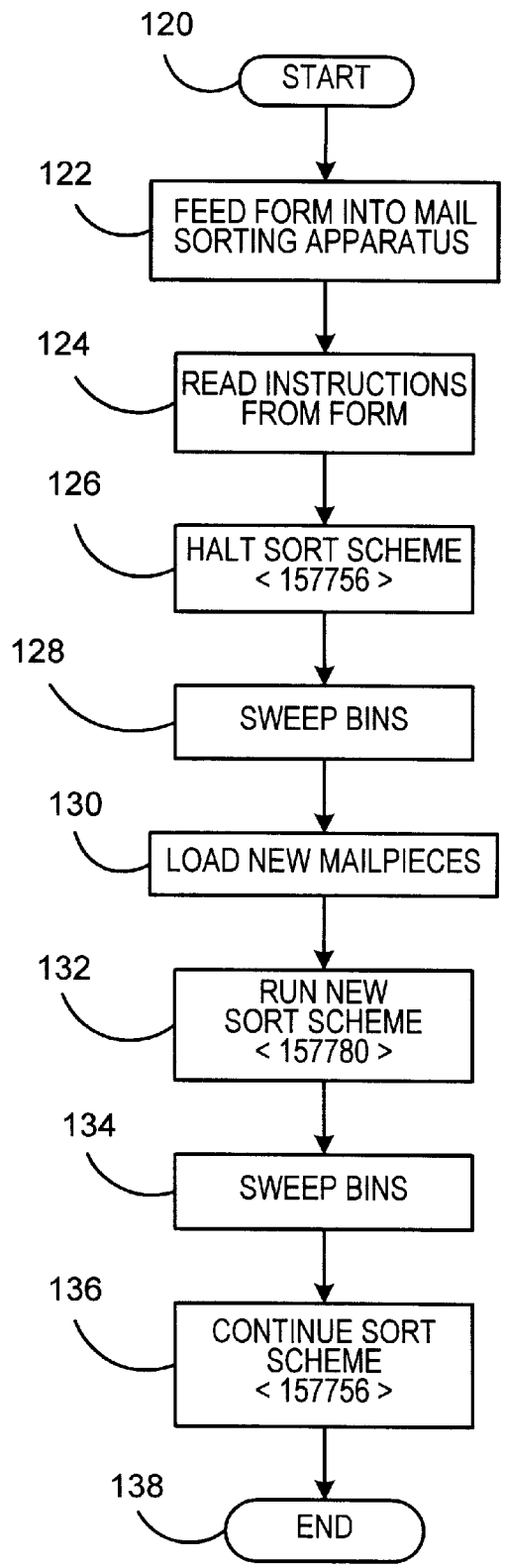
FIG. 4 is a flow chart of one embodiment of the method of the present invention.

FIG. 4 illustrates a flow chart for performing the example instructions of Table A. The job numbers (also called sort schemes) <157756> and <157780> are example job numbers and example job number configurations. At step 120, the method begins. At step 122, a form with instructions is fed into a mail sorting apparatus. At step 124, the mail sorting apparatus reads instructions from the form. At step 126 job <157756> is halted and unprocessed mailpieces removed from the feeder 10. At step 128, the mailpieces of sort scheme <157756> are removed from the bin modules 20. At step 130, mailpieces for sort scheme <157780> are loaded onto the feeder 10 of the mail sorting apparatus 8. At step 132, the new sort scheme <157780> is run. At step 134, the mailpieces of sort scheme <17780> are removed from the bin modules 20. At step 136, sort scheme <15776> is continued. At step 138, the method ends.

The method of the present invention can be further understood by another example of providing instructions to the mail sorting apparatus 8. In the present example, the mail sorting apparatus 8 is used to sort incoming mail for multiple businesses. Sorting instructions are printed onto forms for each of the businesses. Additionally, an initial sorting instruction is printed for an initial sort of the incoming mail which sorts the mail into groups by business. The incoming mail is loaded onto the feeder of the mail sorting apparatus 8. The initial sorting instruction is loaded into the first position on the sorter. The sorting apparatus is operated and reads the initial sorting instruction and proceeds to sort the mail into groups by business. For example, each business has a bin or group of bins that receive mail for that business. In this example, we will assume that the mail for each business is sorted into a bin designated for that business only. After the initial sort is completed, the initial sorting instruction instructs the operator of the mail sorting apparatus 8 to place subsequent sorting instructions on the top of the mailpieces in each bin and sweep the mailpieces from the bins onto the feeder. The operator places subsequent sorting instructions for each business into the bins of each respective business. The mailpieces and instructions are removed from the bins and loaded onto the feeder of the mail sorting apparatus 8. By this operation, the subsequent instructions for each stack of mailpieces is positioned at the front of the stack with respect to the mailpiece feed path of the mail sorting apparatus. The operator is then prompted to run the mail sorting apparatus 8. The mailpieces for each business are sorted in accordance with the sorting instructions that are present on the instruction sheet presented to the sorting apparatus 8 at the front of each stack. The method allows the mail sorting apparatus to be operated efficiently for sortation of multiple small mail sorting jobs without complicated setup.

Figure 5:
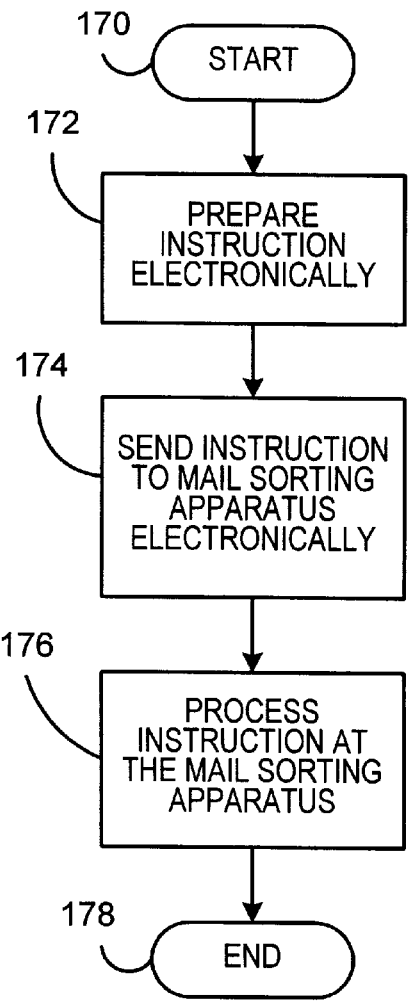
FIG. 5 is a flow chart of an embodiment of a method of the present invention illustrating sending instructions to an addressee database using electronic mail.

In another embodiment, the method of the present invention could be performed by preparing the update information using a computer software program, as described above, which resides on an employee's personal computer or at an intranet site. Saving the update as a data file and electronically mailing the data file to the sorting apparatus 8. The method would require that the sorting apparatus and control 100 be linked to the employee's personal computer by a communications network (not shown). FIG. 5 is a flow chart of an embodiment of a method of the present invention illustrating sending instructions to an addressee database using electronic mail. In one embodiment, the instructions could be in barcode form as described above. At 170, the method begins. At step 172, the instruction information is prepared electronically. At step 174, the instruction information is sent to the mail sorting apparatus electronically. At step 176, the instruction is processed at the mail sorting apparatus. At step 178 the method ends. After the instruction is performed, subsequent mailpieces are routed to appropriate destination bins in accordance with the instructions. The barcode instructions could comprise path information that directs the mail sorting apparatus to an instruction file. The instruction file could be stored in a memory associated with a computer such as, for example, a personal computer which is interfaced with the mail sorting apparatus via a communications interface. The instruction file could be manually edited by a user who has access to the computer on which the instruction file is stored.

The method could alternately be performed by preparing the instructions using a computer software program, as described above, which resides on a personal computer. The instructions could be saved as a data file and electronically mailed to the sorting apparatus 8. The method would require that the sorting apparatus and control 100 be linked to the personal computer by a communications interface (not shown).

These methods provide for more efficient sorting of mailpieces. The present invention provides methods for overcoming the problems of the prior art and efficiently sorting incoming or outgoing mailpieces. While the present invention has been disclosed and described with reference to a single embodiment thereof, it will be apparent, as noted above, that variations and modifications may be made therein. It is also noted that the present invention is not limited to mailpiece sorting. It is, thus, intended in the following claims to cover each variation and modification that falls within the true spirit and scope of the present invention.

What is claimed is:

1. A method of providing instructions to a mail sorting apparatus comprising the steps of:
   a) providing instructions to a computer system;
   b) converting the instructions into a machine readable format using the computer system;
   c) recording instructions on a form, the instructions indicating one or more tasks for the mail sorting apparatus to perform and the form configured to be processed by the mail sorting apparatus;
   d) providing the form to the mail sorting apparatus;
   e) reading the form using a reading device in the mail sorting apparatus;
   f) interpreting the instructions provided to the mail sorting apparatus; and
   g) performing the task or tasks provided by the instructions recorded on the form using the mail sorting apparatus.

2. The method as claimed in claim 1 further comprising the step of, after step (a), validating instructions using the computer system.

3. The method as claimed in claim 1 wherein the instructions are provided in barcode format.

4. The method as claimed in claim 3 wherein the instructions in barcode format comprise path information that directs the mail sorting apparatus to an instruction file.

5. The method as claimed in claim 1 wherein the instructions are provided in magnetized ink format.

6. A method of providing instructions to a mail sorting apparatus comprising the steps of:
   a) creating instructions in electronic form, the instructions indicating one or more tasks for the mail sorting apparatus to perform, and the form configured to be processed by the mail sorting apparatus;
   b) converting the instructions into a machine readable format;
   c) providing the machine readable instructions to the mail sorting apparatus;
   d) reading the machine readable instructions using a control device in the mail sorting apparatus;
   e) interpreting the instructions provided to the mail sorting apparatus;
   f) performing the task or tasks provided by the instructions using the mail sorting apparatus.

7. The method as claimed in claim 6 further comprising the step of, after step (a), validating instructions using the computer system.

8. The method as claimed in claim 6 wherein the machine readable instructions are provided in barcode format.

9. The method as claimed in claim 8 wherein the instructions in barcode format comprise path information that directs the mail sorting apparatus to an instruction file.

* * * * *